Nov. 27, 1951 — P. I. COLE — 2,576,673
FLUID SEAL
Filed Sept. 9, 1946 — 2 SHEETS—SHEET 1

INVENTOR.
PRENTISS I. COLE
BY
ATTORNEYS

Nov. 27, 1951 P. I. COLE 2,576,673
FLUID SEAL
Filed Sept. 9, 1946 2 SHEETS—SHEET 2
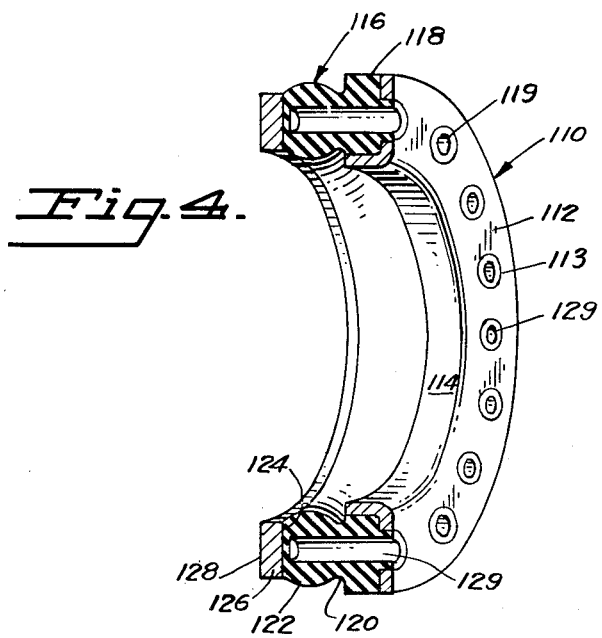
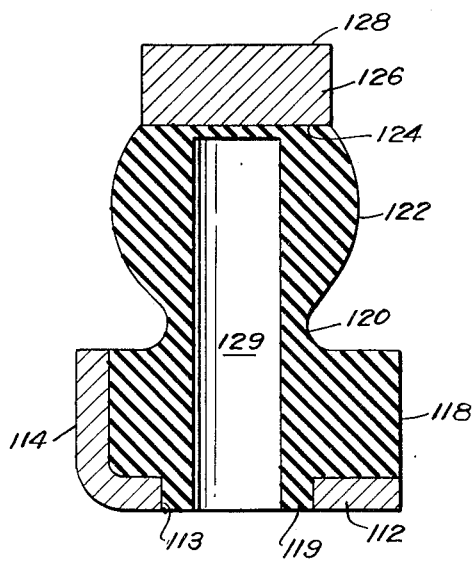
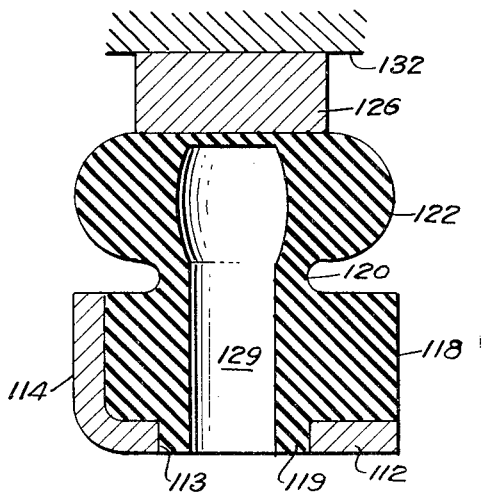
INVENTOR.
PRENTISS I. COLE
BY
ATTORNEYS Patented Nov. 27, 1951

2,576,673

UNITED STATES PATENT OFFICE 2,576,673

FLUID SEAL

Prentiss I. Cole, Palo Alto, Calif.

Application September 9, 1946, Serial No. 695,666

6 Claims. (Cl. 288—3)

This invention relates to fluid seals, and more particularly to face seals.

There are two general types of face seals, one type being adapted to be pressed on a shaft to turn therewith and to seal against a surface parallel to the sealing face, while the other type is adapted to be press-fitted into a bore, to remain stationary with the bore or to revolve therewith, as the case may be, and to seal against a surface parallel to the sealing face. With both types the principal problem has been to provide means for holding the sealing face against the sealing surface. This has been accomplished mechanically by use of a spring or of a resilient material such as sponge rubber.

The use of spring mechanisms results in a high unit cost of the face seal, and the use of sponge rubber is not conducive to a long life period for the seal, since the sponge absorbs oil which reduces the resiliency of the material, and the nitrogen filled cells of the rubber become gas-free after long periods of compression, also causing the resiliency of the sponge rubber to become appreciably reduced.

A conventional face seal, such as the sponge rubber type above-mentioned, is comprised of a retainer member, such as a metal cup or washer, a sponge rubber suspension member bonded to the retainer member, and a sealing face of suitable material, such as fiber, bonded to the other face of the suspension member. The amount of work that is performed by the elastic suspension member in holding the sealing face against the sealing surface is a function of the dimensions and contour of the cross section of the elastic member, the elastic modulus of the rubber, the distribution of the pressure, the temperature, the degree of non-parallelism between the sealing face and the retainer member, the distance the metal case extends up the side of the suspension member, and other variables.

With the conventional cross-sectional contours for the suspension member, such as square, rectangular, circular or trapezoidal, it is not feasible to substitute solid rubber for the sponge rubber of the suspension member. Since solid rubber is highly incompressible and yields almost entirely through stress, the conventional cross-sectional contours would flex or buckle to a certain degree in unpredictable fashion to tend to disturb the parallelism between the retainer member and the sealing face, resulting in non-uniform force application between the sealing face and the sealing surface. A further consideration is that a solid rubber suspension member having a conventional cross-sectional form is sufficiently non-yieldable to cause excessive pressure between the sealing face and the sealing surface, resulting in undue wear of both the face and the surface.

I have found that when solid rubber is utilized for the suspension member having a cross-sectional contour hereinafter described, the suspension member may have the same deflection as sponge rubber under the same working load per unit area without the short life period inherent in the use of sponge rubber.

An object of the invention, therefore, is to provide a face seal having a solid rubber suspension member with the equivalent flexibility of conventionally shaped sponge rubber suspension members.

Another object of the invention is to provide a suspension member for a face type fluid seal having a life period of greater duration than conventional suspension members.

And yet another object of the invention is to provide an elastic suspension member for a face seal having a cross-sectional contour allowing for a uniform compressive lateral expansion everywhere normal to the applied working load.

And still a further object of the invention is to provide an elastic suspension member for a face seal having a cross-sectional contour allowing of free compression of the suspension member under an applied working load with no attendant restriction by the retainer member bonded to said suspension member.

Other objects and advantages of the invention will be apparent from the following description taken in conjunction with the drawings forming part of this specification, and in which:

Fig. 4 is a view similar to Fig. 1 of a modification of the fluid seal embodied in the invention; and Figs. 5 and 6 are views of the seal of Fig. 4, similar, respectively, to Figs. 2 and 3.

Figure 1:
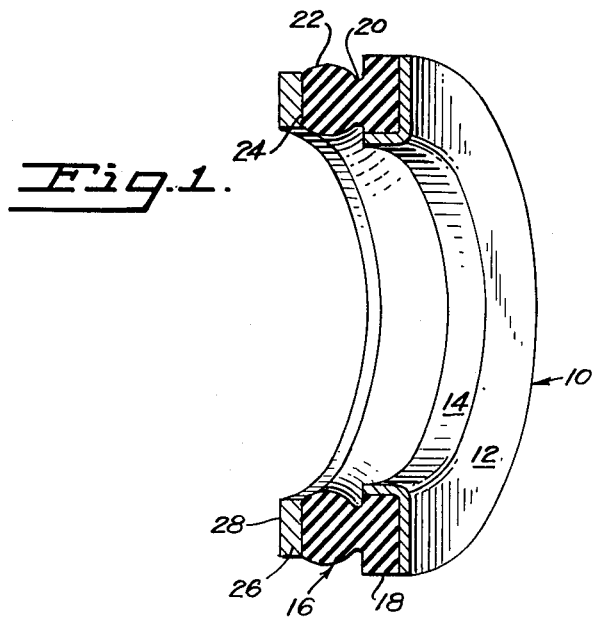
Fig. 1 is a view in perspective of one embodiment of the invention showing a diametral section of the fluid seal.

Referring to the drawings for more specific details of the invention, 10 indicates generally an annular retainer member, having a disc portion 12 and a flange portion 14, bonded to an annular rubber suspension member indicated generally at 16, said suspension member comprising a base portion 18 rectangular in cross section, a web 20 restricted in cross section and a crown 22 substantially ovoid in cross section having a flat surface 24. A fiber ring 26 having a sealing face 28 is bonded to the surface 24 of the suspension member 16.

Figure 3:
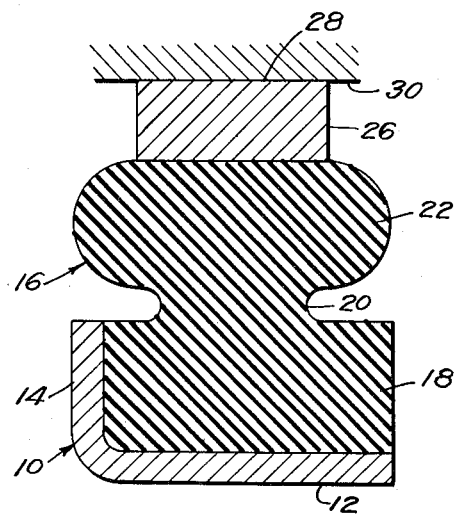
Fig. 3 is a view similar to Fig. 2 showing the seal in pressing engagement with a sealing surface.

The seal, as shown in Fig. 1 wherein the flange portion 14 of the retainer member is within the suspension member 16, is adapted to be press-fitted on a shaft, not shown, with the sealing face 28 of the seal in pressing engagement with a sealing surface 30, as shown in Fig. 3. The frictional engagement between the flange portion 14 of the retainer member and the rotatable shaft prevents axial displacement of the seal along the shaft to relieve the compressed crown 22 of the suspension member 16. Thus, a constant pressure between the sealing face 28 and the surface is provided.

It will be noted from Fig. 3 that the crown 22 of the suspension member 16 expands uniformly under compression in a direction normal to the applied working load, said working load being normal to the sealing face 28. It will also be noted that there can be substantially no transmission of force through the suspension member tending to disturb the bonded interfaces of the flange portion 14 and the base 18 of the suspension member, and, conversely, that the flange portion 14 can exert substantially no opposing force to the compression of the crown 22 of the suspension member. It will also be noted that the longitudinal median lines, or vertical center-of-mass lines, of the crown 22 and web 20 are in alignment, both when the suspension member is in an unstressed condition, as in Figure 2, and in a compressively stressed condition, as in Figure 3. Stated otherwise, the web and crown are symmetrically arranged, and the web is of sufficient lateral thickness in relation to its length to prevent any lateral buckling of the web when compressive forces are applied to the suspension member.

Figure 2:
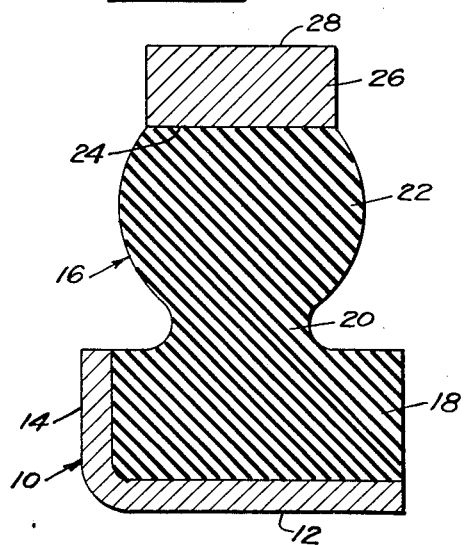
Fig. 2 is an enlarged view in cross section of the fluid seal of Fig. 1, showing the seal in unstressed condition.

Through utilization of a suspension member of the general cross-sectional contour shown in Figs. 1–3, a conventional solid rubber stock will permit of a deflection under the same working load per unit area, substantially equivalent to the deflection of a conventional sponge rubber suspension member of uniform cross sectional width of the order of the width of the base portion 18 of the suspension member shown.

A modification of the fluid seal is shown in Figs. 4 to 6 wherein 110 indicates generally an annular retainer member, having a disc portion 112 with a plurality of centrally located spaced apertures 113 and a flange portion 114, bonded to an annular rubber suspension member indicated generally at 116, said suspension member comprising a base portion 118 having a plurality of spaced annular flanges 119 extending into the apertures 113 and bonded to the periphery thereof, a web 120 restricted in cross section, and a crown 122 having a flat upper surface 124. A fiber ring 126 having a sealing face 128 is bonded to the surface 124 of the suspension member 116, while a plurality of spaced cylindrical passages 129 extend into the suspension member 118, as shown, each of said passages 129 being concentric with respect to an aperture 113 in the retainer member 110.

The bonding of each flange 119 to the periphery of an aperture 113 substantially compensates for the loss of areal bonding contact between the suspension member 116 and the retainer member 110 due to the provision of apertures in this modification of the invention.

The cylindrical passages 129 provide for a greater flexibility of the suspension member 116 under the applied working load and thus make it possible to substitute a harder rubber stock than would be feasible in the suspension member 16 of Figs. 1 to 3 to obtain a deflection equivalent to that of sponge rubber. The passages 129 may be varied in diameter, depth and number to obtain desired deflection characteristic for the suspension member.

The principal feature of the fluid seal of Figs. 4 to 6 is that the passages 129 make possible the use of the seal as a pressure seal. When the seal is sleeved on a shaft with the mouths of the passages exposed to the pressurized fluid medium, the pressure is transmitted through the passages to the sealing ring 126, thus increasing the pressure of the sealing face 128 against the sealing surface 132 by an amount equal to the pounds per square inch pressure of the fluid medium multiplied by the cross sectional area of the passages in inches. This pressure may be regulated by varying the number and diameter of the passages.

The flange portions of the retainer members of both modifications of the fluid seal may be located at the outer periphery of the suspension member to adapt the seal for a press-fitting within a bore, or the flange portions may be omitted entirely to provide a washer-type retainer member, a particular configuration of said member not being deemed essential to the invention.

While one embodiment of the invention and a modification thereof have been shown and described, it is understood that other modifications are possible within the scope of the appended claims.

What I claim as new and desire to secure by Letters Patent is:

1. In a fluid seal of the face seal type, a unitary rubber suspension member annular in form comprising, with respect to the cross-section of the annulus, a substantially rectangular base, a web of restricted width supported by the base, and a crown supported by the web, said crown having a gradually increasing width from its lower portion to mid-portion and a gradually decreasing width from mid portion to the upper portion thereof, the longitudinal median line of said web being in alignment with the longitudinal median line of said crown, both when the suspension member is unstressed and compressively stressed in the direction of said median lines.

2. A fluid seal of the face seal type comprising an annular rubber suspension member having a base, a crown, and a web of restricted cross section joining the base and the crown, an annular metal retainer member bonded to the base, a fiber sealing member bonded to the upper surface of the crown, and a plurality of passages extending through the retainer member and into the suspension member.

3. A fluid seal of the face seal type comprising an annular flexible suspension member, an annular metal retainer member bonded to one end of the suspension member, an annular sealing member bonded to the other end of the suspension member, and a plurality of spaced passages extending through the retainer member and into the suspension member.

4. A fluid seal of the face seal type comprising an annular flexible suspension member, an annular metal retainer member bonded to one end of the suspension member, an annular sealing member bonded to the other end of the suspension member, and a plurality of spaced axial passages extending through the retainer member and into the suspension member to a point adjacent the sealing member.

5. A fluid seal of the face seal type comprising an annular flexible member having a base surface at one end thereof and a sealing surface at the other end thereof, and a plurality of spaced passages extending from the base surface into the member.

6. A fluid seal of the face seal type comprising an annular flexible member having a base surface at one end thereof and a sealing surface at the other end thereof, and a plurality of spaced axial passages extending into the member from the base surface to a point adjacent the sealing surface.

PRENTISS I. COLE.

REFERENCES CITED

The following references are of record in the file of this patent:

UNITED STATES PATENTS

| Number | Name | Date |
| --- | --- | --- |
| 2,227,304 | Geyer | Dec. 31, 1940 |
| 2,360,372 | Snyder | Oct. 17, 1944 |
| 2,373,443 | Armington | Apr. 10, 1945 |

FOREIGN PATENTS

| Number | Country | Date |
| --- | --- | --- |
| 522,720 | Great Britain | 1940 |
| 554,331 | Great Britain | 1943 |
| 564,714 | Great Britain | 1944 |